March 19, 1940. N. TULLIO 2,194,336
WEED PULLER
Filed April 10, 1939
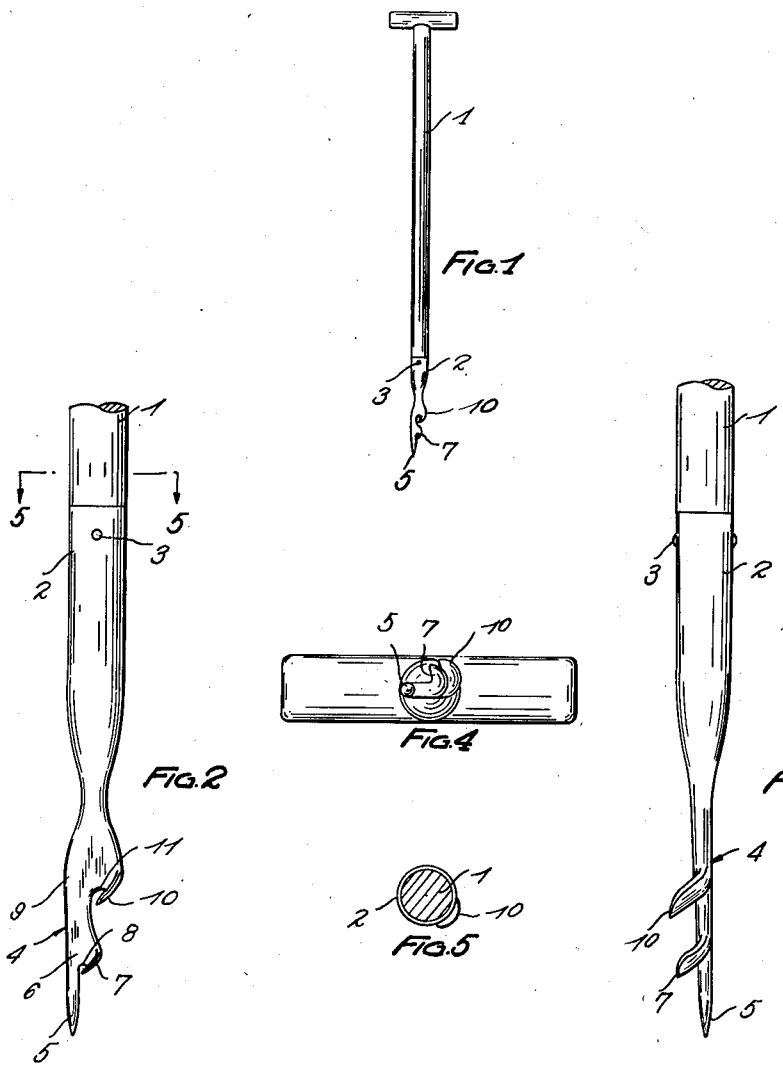
INVENTOR.
NICHOLAS TULLIO
BY Milburn & Milburn
ATTORNEYS.

Patented Mar. 19, 1940

2,194,336

UNITED STATES PATENT OFFICE 2,194,336

WEED PULLER

Nicholas Tullio, Cleveland Heights, Ohio

Application April 10, 1939, Serial No. 267,129

3 Claims. (Cl. 55—65)

This invention relates to the art of garden implements and is an improvement in a device for pulling weeds.

The object of this invention is to devise a hand tool or implement by which the weeds of various sorts can be pulled out of the ground by the roots so as to eradicate the same.

A further object is to devise such an implement that can be manipulated without having to bend over, thereby making the operation much less tiring than the old practice.

The specific structure of my improved implement is also to be regarded as constituting an object of my invention, as hereinafter more fully described.

Other objects will appear from the following description and claims when considered together with the accompanying drawing.

Fig. 1 is an elevation of my complete assembly;

Fig. 2 is an enlarged view of the lower portion thereof;

Fig. 3 is a view taken at ninety degrees to Fig. 2;

Fig. 4 is a lower end view thereof; and

Fig. 5 is a view taken on line 5—5 of Fig. 2.

It is to be understood that the present form of disclosure is merely for the purpose of illustration and that there may be devised various modifications thereof without departing from the spirit of my invention as herein set forth and claimed.

In the present form of illustration, as shown herein, the tool itself is attached to handle 1 which is of suitable length and form to be carried in much the same manner as a cane, that is without requiring the user to bend over while pulling the weeds from the ground. The lower end of the handle portion is tapered so as to be received and secured within the upper hollow end portion 2 of the tool itself, such attachment being effected by means of a pin 3.

The lower part of the tool is of comparatively flat form, as indicated by reference numeral 4, which terminates in the substantially round pointed end portion 5 which is adapted to be inserted into the ground. Just above the end portion 5 there is the substantially wider portion 6 which has the laterally and downwardly extending spear hook portion 7 which has an inclination of about forty-five degrees with respect to the flat surface of the adjacent part of the tool.

It will be observed that just below the base of the spearhook 7 there is a recess 8, for a purpose to be explained. At a point above the spear hook 7 there is a substantially wider portion 9 which has the laterally and downwardly extending spear hook portion 10 which bears approximately the same angular relation as does the portion 7. It will be observed that the hook portion 10 is of greater extent than the hook 7 and that the recess 11 at the base thereof is of greater depth both laterally and vertically. It should be observed also that the hook portions 7 and 10 are so arranged as to bear a somewhat tapering relation with respect to the pointed end 5, thereby facilitating the insertion of the tool into the ground to the full extent required. The hook portions are also formed in such manner that they may readily be inserted into the ground, both as the tool is first inserted into the ground and then turned about the longitudinal axis thereof, as will be now explained.

This tool will, of course, be employed at a time when the ground is sufficiently soft to permit insertion of the pointed end of the tool thereinto to the required depth. As such insertion proceeds, the hooks 7 and 10 will be brought into close juxtaposition to the roots of the weeds, whereupon the tool will be given a turning motion about its longitudinal axis so as to cause the weed roots to be twisted about the tool for removal. This is accomplished by virtue of the fact that the roots are engaged within the recesses 8 and 11, especially the latter, and then are engaged with a twisting action by the spear hooks 7 and 10 which effectively grip the roots in much the same manner as the fingers of the human hand. That is, the hooks 7 and 10 are so constructed and arranged and are so engaged with the roots that they are effective in twisting themselves about the roots and then pulling the same upwardly so as to remove the same. In this connection, it will be observed that the recesses 8 and 11, especially the recess 11, extend to a point above the elevation of the corresponding ends of the hooks 7 and 10, respectively.

Not only will my particular form of hook portions permit the ready insertion of the same into the ground, but they can also be readily withdrawn from the ground without causing any serious disturbance of the same, it being merely necessary to place the foot upon the sod which has been somewhat loosened by the removal of the weed and its roots with the tool.

This tool can be made and sold at a comparatively low price and the degree of efficiency with which it can be used, both as to ease of operation and success in the results obtained, should recommend it for very extensive use for the purpose intended. Instead of the laborious and ineffective practice of pulling only the top parts of the weeds which soon return, my present implement can be readily inserted to a substantial depth below the surface of the ground so as to effectively engage and remove the roots to such an extent that the weed will not re-appear.

What I claim is:

1. A weed puller comprising a shank portion with a pointed end, said shank having a plurality of vertically spaced, downwardly and inwardly and angularly inclined spear hooks above said pointed end, said shank being recessed between said hook portions so as to receive the roots of the weeds for twisting engagement by the upper hook portion upon turning the shank about its longitudinal axis.

2. A weed puller comprising a shank with a pointed end substantially round in form, said shank having two vertically spaced, downwardly and inwardly and laterally inclined spear hooks above said end portion, the lower one of said spear hooks being of less lateral extent than the upper one so that said spear hooks and pointed end portion have an over-all substantially tapering relation with each other, said shank being recessed in the region beneath said spear hooks so as to provide space for receiving the roots for twisting engagement by the spear hooks upon turning the shank about its longitudinal axis.

3. A weed puller comprising a shank with a substantially flat portion and an adjacent substantially round pointed end portion, said flat portion having a comparatively wide upper portion and a comparatively narrow middle portion, said upper and middle portions having correspondingly extending substantially spaced spear hooks projecting downwardly and inwardly and angularly from the flat shank portions, the lower one of said spear hooks being of less lateral extent than the upper one so that said upper and middle portions with their spear hooks has a generally downwardly tapering relation with respect to the pointed end portion, said shank portion being formed with vertically and laterally extending recesses of substantial vertical extent in the region of the bases of the spear hooks so as to receive the roots of the weeds for twisting engagement by the spear hooks upon turning the shank about its longitudinal axis.

NICHOLAS TULLIO.

CERTIFICATE OF CORRECTION.

Patent No. 2,194,336.

March 19, 1940.

NICHOLAS TULLIO.

It is hereby certified that error appears in the printed specification of the above numbered patent requiring correction as follows: Page 2, first column, line 18, claim 2, for the word "laterally" read --angularly--; and that the said Letters Patent should be read with this correction therein that the same may conform to the record of the case in the Patent Office.

Signed and sealed this 14th day of May, A. D. 1940.

(Seal)

Henry Van Arsdale,
Acting Commissioner of Patents.